Aug. 21, 1945. H. O. NIEDERER ET AL 2,383,270
DEVICES FOR ARRANGING ARTICLES ON CONVEYING MEANS
Filed Nov. 21, 1942 2 Sheets-Sheet 1
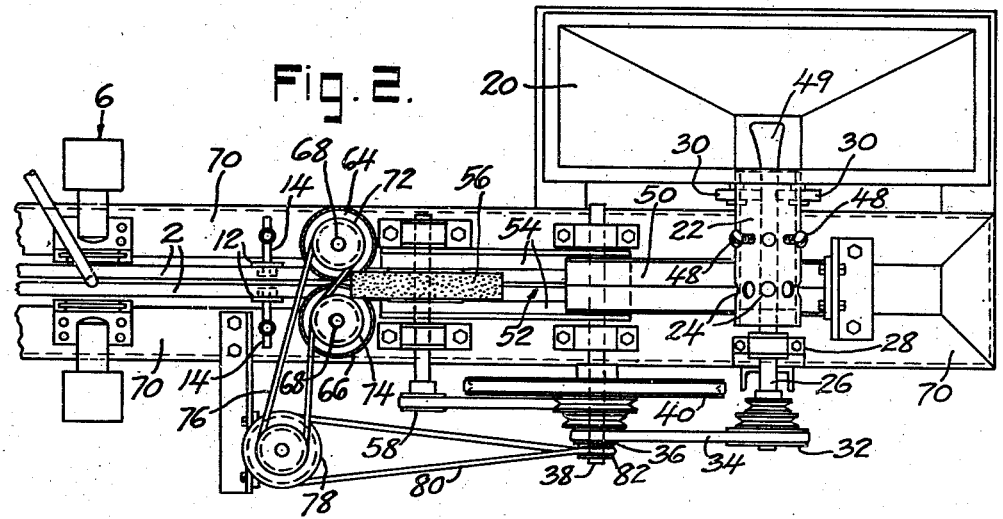
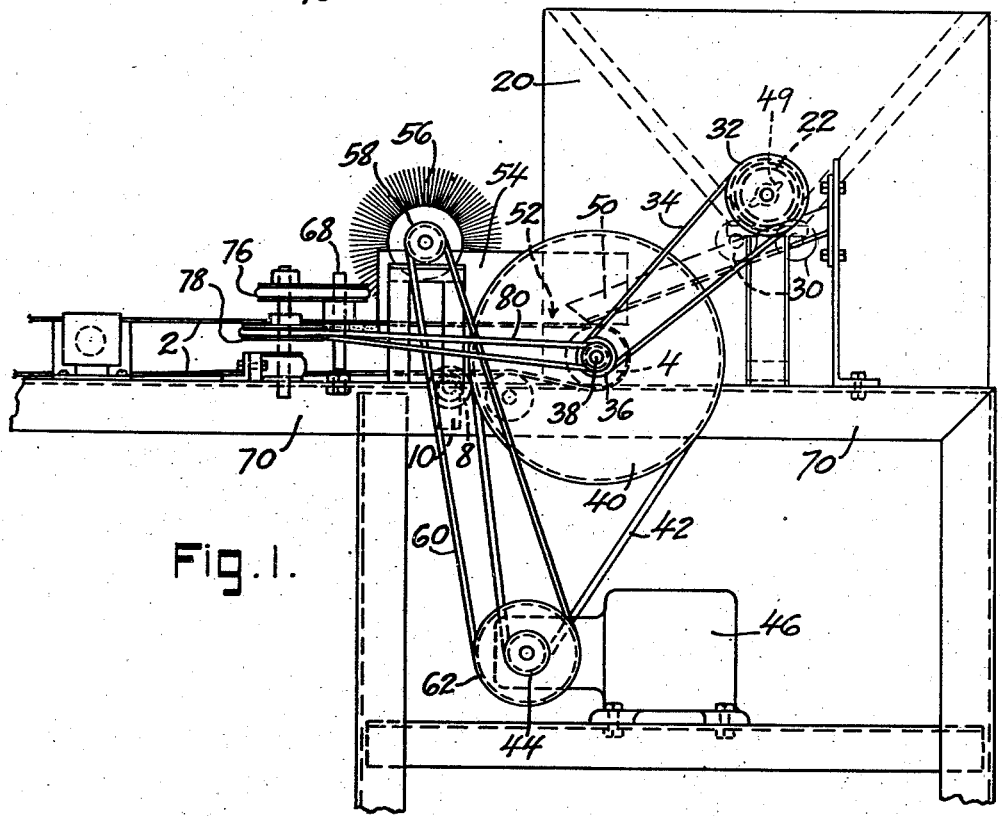
INVENTORS
HERBERT O. NIEDERER
OTTO C. NIEDERER
BY Albert Sperry
ATTORNEY Aug. 21, 1945. H. O. NIEDERER ET AL 2,383,270
DEVICES FOR ARRANGING ARTICLES ON CONVEYING MEANS
Filed Nov. 21, 1942 2 Sheets-Sheet 2

INVENTORS
HERBERT O. NIEDERER
OTTO C. NIEDERER
BY Albert Sperry
ATTORNEY

Patented Aug. 21, 1945

2,383,270

UNITED STATES PATENT OFFICE 2,383,270

DEVICE FOR ARRANGING ARTICLES ON CONVEYING MEANS

Herbert O. Niederer and Otto C. Niederer, Titusville, N. J.

Application November 21, 1942, Serial No. 466,504

3 Claims. (Cl. 198—34)

This invention relates to mechanism for feeding and arranging articles on a conveying means whereby they may be spaced or positioned in a predetermined manner with respect to the conveying means.

While the invention is of general application and may be used in combination with many different types of mechanism it is hereinafter described with particular reference to its use with sorting mechanism such as the rivet sorting device of the copending application of Edward E. Garlits, Jr., Serial No. 450,929, filed July 14, 1942.

The rivet sorter of said copending application embodies conveying means in the form of parallel bands, threads, wires or other members which are spaced apart so that rivets or other headed articles will be supported thereon with the heads of the rivets resting on the bands while the shanks of the rivets extend downward between the bands. The rivets thus supported are moved with the conveying means past ejecting devices actuated by suitable means, such as a photoelectric cell, to extract rivets of different size or type at different stations along the path of movement of the conveyor. It is found in practice that rivets sometimes are located crosswise of the bands or they may be fed to the bands or conveying means so rapidly that the heads of the rivets overlap or are too close together to insure the most satisfactory and accurate sorting of the rivets.

In order to overcome this difficulty the present invention provides novel feeding mechanism and devices for delivering rivets or other articles to conveying means and for positioning them in a predetermined arrangement or spaced relation on the conveying means to permit the most effective sorting, handling or treating of the articles. Rivets which are turned crosswise or are otherwise arranged improperly on the bands are thus prevented from passing on to the sorting mechanism or other device for the treatment or handling thereof.

When used with other types of conveying means the invention serves in a similar manner to reject improperly positioned articles and to arrange articles in predetermined position on the conveyor.

One of the objects of the present invention is to provide a novel type of mechanism for arranging articles on conveying means in predetermined relation with respect to the conveying means and with respect to each other.

Another object of the invention is to provide means for spacing rivets or the like on supporting bands or the like.

A further object of the invention is to prevent the delivery of improperly positioned rivets or articles to sorting mechanism or the like.

These and other objects and features of the present invention will appear from the following description thereof in which reference is made to the figures of the accompanying drawings.

Fig. 1 is a side elevation of a portion of a rivet sorting machine embodying the present invention.

Fig. 2 is a top plan view of the construction shown in Fig. 1.

Figure 3:
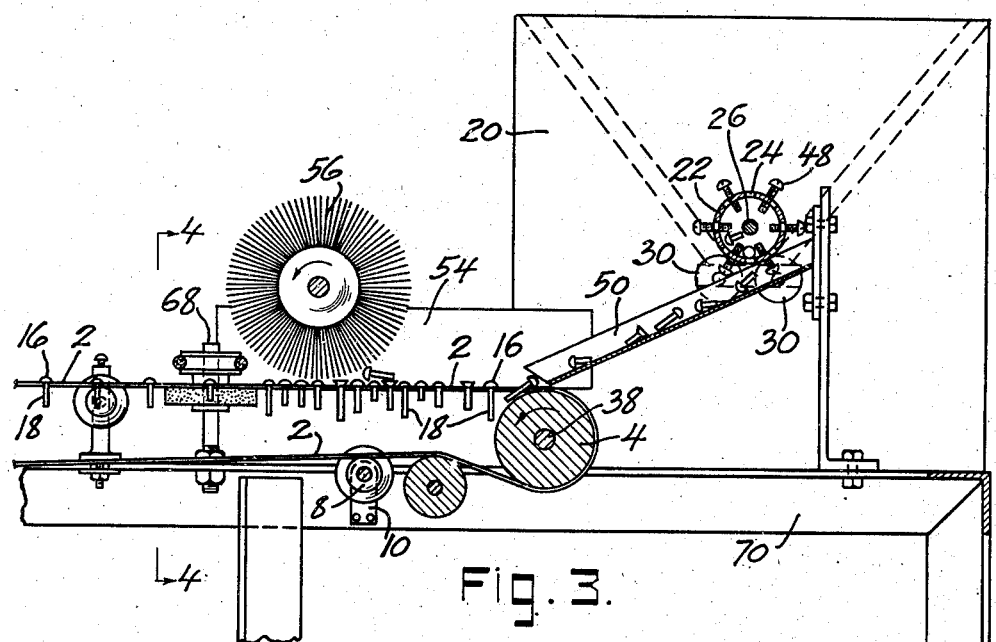
Fig. 3 is a longitudinal vertical sectional view of the construction shown in Fig. 1.

In that form of the invention selected for purposes of illustrating a preferred embodiment thereof and as shown in the figures of the drawings, a rivet sorting device is provided with spaced bands 2 which are advanced by a driving roller 4. The upper run of the bands by which the rivets to be sorted are carried extends horizontally from the roller 4 and moves to the left as seen in Figs. 1 and 2 to ejecting devices, one of which is shown at 6. The spacing of the bands is controlled by passage of the lower run thereof over flanged rollers 8 mounted on adjustable brackets 10 so that they are properly spaced on the driving roller, whereas additional flanged rollers 12 mounted on brackets 14 serve to space the upper run of the bands 2 as they approach the ejecting devices 6. The spacing of the bands 2 is controlled to permit rivets to be carried by the bands with the heads 16 thereof resting on the bands and with the shanks 18 thereof extending downward between the bands.

Mixed accumulations of rivets to be sorted are supplied to a hopper 20 and pass therefrom through a tube 22 provided with discharge openings 24. The outer end of the tube is closed and provided with a shaft 26, mounted for rotation in the bearing 28 while the portion of the tube adjacent the hopper is supported on the rollers 30. The tube 22 is rotated by the pulley 32 on the shaft 26 through the belt 34 and pulley 36 on shaft 38. The shaft 38 in turn is rotated by the pulley 40 through belt 42 and pulley 44 driven by motor 46. Screws 48 are adjustably threaded into the tube 22 between the hopper 20 and discharge openings 24 and project into the tube so as to control the passage of rivets to the discharge openings. As the tube 22 rotates the rivets which have passed the screws 48 move on to the discharge openings so that they are fed frequently but a few at a time to the chute 50 for delivery to the upper run of the conveying bands 2 near the driving roller 4. In order to prevent clogging of the rivets in the hopper and thereby insure continued feed thereof to the tube 22 the shaft 26 may be extended so that it projects into the hopper as shown in Fig. 2 and the end 49 of the shaft may be flattened or otherwise formed to agitate the rivets in the hopper. It is found in practice that agitating means are particularly useful when the rivets are large and tend to clog in the hopper. With smaller rivets no agitating means need be used.

The chute 50 is V-shaped in cross section and the lower end thereof is located over the space 52 between the bands 2. The driving roller 4 for the bands is secured to the shaft 38 so that the delivery of rivets to the bands from tube 22 is coordinated with the speed of movement of the bands toward the sorting mechanism or other devices for handling the rivets.

The rivets discharged into the chute 50 and at least partially arranged parallel to the bands by passage down the chute are delivered to the bands and some of them are properly positioned with the heads 16 resting on the bands and the shanks 18 extending downward between the bands. However, some of the rivets are not so arranged and lie in positions crosswise of the bands or are inclined with respect thereto and these rivets have to be displaced or rearranged before they pass on to the sorting and ejecting devices.

In order to rearrange the improperly positioned rivets guide means, shown as inclined side plates 54 are located adjacent and above the bands 2 and a rejecting device in the form of a rotatable brush 56 is located above the bands 2 and over the space 52 between the bands. The brush is spaced from the bands a distance sufficient to clear the heads of those rivets which are properly positioned on the bands but is close enough thereto to engage any improperly positioned rivets advancing with the bands toward the sorting devices. The brush is rotated to cause the lower portion thereof to travel in a direction opposite to that in which the bands move and is driven directly from the motor 46 through the pulley 58, belt 60 and the large motor driven pulley 62. The brush 56 rotates relatively rapidly so that improperly positioned rivets are removed from the bands and are thrown rearwardly toward the chute 50 and inclined side plates 54 of the guide means. They are thus repeatedly returned to the guide means so that they will ultimately be directed into the proper position with the shank extending downward between the bands.

The rivets passing the rejecting device are properly positioned with respect to the bands 2 but are frequently arranged too close together or the heads may partially overlap or they are otherwise positioned improperly with respect to each other so that the most effective and accurate operation of the sorting devices is not assured. It is therefore desirable to arrange the rivets in spaced relation along the conveying means to permit successive treatment of each rivet independently. For this purpose spacing means are located adjacent the bands in position to engage each rivet to move the rivets relative to the bands.

Figures 4, 5:
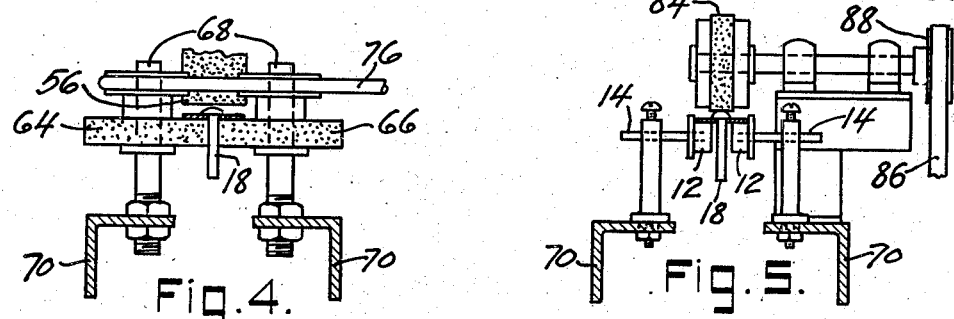
Fig. 4 is a transverse sectional view of the construction shown in Figs. 1 and 2 taken on the line 4—4 of Fig. 3.
Fig. 5 is a transverse vertical sectional view of a rivet sorting machine of the type shown in Fig. 1 illustrating a modified form of a rivet sorting machine embodying the present invention.
Figure 6:
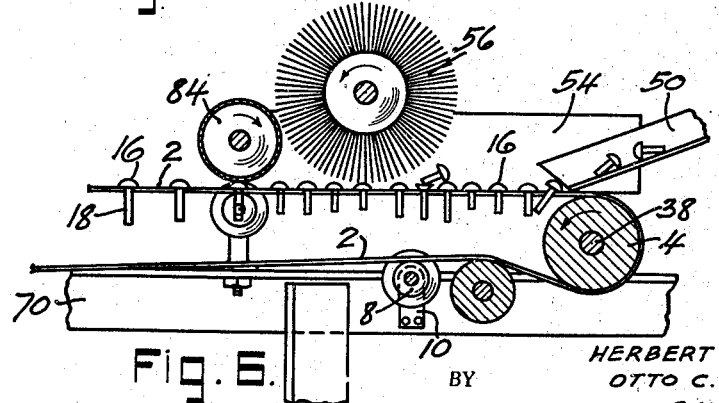
Fig. 6 is a side elevation of the construction shown in Fig. 5.

The preferred form of spacing means shown in Figs. 1 to 4 embodies two rollers 64 and 66 rotatably mounted on vertical shafts 68 on the frame 70 of the machine. The rollers 64 and 66 are located directly beneath the bands in position to engage the shanks of the rivets as they are advanced by the bands. The roller 64 is connected to a pulley 72 located above the bands 2 while the roller 66 is provided with a similar pulley 74. A belt 76 passes about the pulleys 72 and 74 as shown in Fig. 2 and is driven from a pulley 78 and belt 80 from the pulley 82 on shaft 38. In this way the adjacent surfaces of rollers 64 and 66 are rotated together and at the same speed to engage the opposite sides of rivets supported on the bands. These rollers are provided with yielding surfaces formed of sponge rubber or the like for engaging the rivets and are driven so that they positively grasp and move the rivets in the same direction but at a slower speed than the bands 2 to retard the rivets as the bands advance. The rivets are thus spaced apart along the bands and are arranged for the most efficient sorting or handling thereof.

After being properly arranged on the bands 2 the rivets pass on with the bands to the sorting devices or other mechanism by which they are to be handled.

While the spacing means shown in Figs. 1 to 4 are located below the bands 2 and engage the shanks of the rivets other forms of spacing means may be used. Thus as shown in Fig. 5 the spacing means employed may engage the heads of the rivets only. For this purpose a single roller 84 is located above the bands 2 and over the space 52 therebetween. The roller 84 is driven from the motor or other source of power by belt 86 and pulley 88 and is caused to rotate at a speed somewhat slower than the bands 2. The surface of the roller is formed by soft rubber or is otherwise cushioned so that the heads of the rivets engaged thereby pass readily beneath the roller but they are retarded in their movement. The bands therefore advance faster than the rivets and the rivets are spaced apart by being displaced longitudinally with respect to the band.

The roller 84 is found to operate very successfully by itself when the rivets or articles present a flat surface in engagement with the bands, as in the case of round headed or brazier headed rivets. However, counter sunk rivets which have a tapered surface engaging the bands 2 tend to tilt or rock on the bands when moving into and out of engagement with the rounded surface of the roller 84. In some instances, and particularly when the rivets are small and the shank of the rivet is very short, this tilting is sufficient to cause the rivets to be raised from the bands so that they fall to the floor or are otherwise improperly handled. When sorting such rivets or other articles it is generally advisable to use the preferred form of spacing means shown in Fig. 1 and located beneath the bands.

The operation of the mechanism shown and described will be apparent from the foregoing description thereof but may be summarized as follows: Mixed accumulations of rivets are charged into the hopper 20 and are fed a few at a time to the chute 50 through the discharge openings in the rotatable tube 22. The rivets are rather generally aligned with the space 52 between the bands 2 during their passage down the chute by the inclined sides of the chute. Some of the rivets therefore pass directly into proper position on the bands with the heads 16 resting on the bands and the shanks 18 extending downward between the bands. Those rivets which are improperly positioned travel with the bands between the inclined side plate 54 to the brush 56 which rotates in a direction to throw such rivets back toward the chute so that they engage the chute or side plates and are again directed toward the space between the bands. In this way the only rivets passing the brush are those which are properly positioned on the bands and therefore are cleared by the brush. The rivets passing the brush 56 are carried by the bands to spacing means which include the shank engaging rollers 64 and 66 or the head engaging roller 84. These rollers are rotated so as to travel in the same direction but at a slower speed than the bands and therefore retard the rivets while the bands continue to move so that the rivets are spaced apart along the bands and arranged for the most effective handling thereof by the sorting device or other apparatus to which they are passed.

While the invention has been illustrated and described as used in the handling of rivets passing to a sorting device it will be apparent that the articles being handled need not be rivets but may be any other type of article. It will also be apparent that the articles may be arranged for use or handling by any other mechanism or devices and the type of conveying means and feeding devices used may be varied to handle any preferred form or shape of article. The form, arrangement and method of operating the various elements of the combination therefore may be altered or changed in many ways without departing from the spirit and scope of the invention. In view thereof it should be understood that the particular embodiment of the invention shown in the drawings and described above is intended for illustrative purposes only and is not intended to limit the scope of the claims.

We claim:

1. In a rivet handling device having parallel bands spaced apart a sufficient distance to support rivets with the heads thereof resting on the bands and with the shanks thereof extending downward between the bands, means for arranging the rivets on said bands in said position and in spaced relation, comprising, means for delivering rivets to said bands, guide means located adjacent said bands for directing said rivets to the space between the bands, means for returning to said guide means those rivets carried by the bands and not so positioned, and means located below said bands and engageable with the shanks of the positioned rivets to space them apart along the bands.

2. In a mechanism for handling rivets or other similar articles, means for feeding rivets in a controlled manner comprising, a hopper for receiving the rivets, a tube communicating at one end with the lower portion of said hopper and formed with a plurality of radially directed openings therein through which the rivets are delivered, adjustable means extending through said tube to regulate the progress of rivets therethrough, and means for rotating said tube.

3. A device of the character set forth in claim 2 in which the adjustable means comprises adjustable pins extending through the walls of the tube.

HERBERT O. NIEDERER.
OTTO C. NIEDERER.